(12) United States Patent
Raiser

(10) Patent No.: US 6,323,626 B1
(45) Date of Patent: Nov. 27, 2001

(54) DC/DC CONVERTER FOR A FUEL CELL HAVING A NON-LINEAR INDUCTOR

(75) Inventor: Stephen Raiser, Egelsbach (DE)

(73) Assignee: General Motors Corporation, Detroit, MI (US)

( * ) Notice: Subject to any disclaimer, the term of this patent is extended or adjusted under 35 U.S.C. 154(b) by 0 days.

(21) Appl. No.: 09/504,350

(22) Filed: Feb. 14, 2000

(51) Int. Cl.⁷ .................................................. G05F 1/46
(52) U.S. Cl. ............................................. 323/222; 323/282
(58) Field of Search ............................ 363/60; 323/282, 323/283, 284, 285, 222, 223

(56) References Cited

U.S. PATENT DOCUMENTS

| | | | |
|---|---|---|---|
| 4,084,103 | * 4/1978 | Burns, III et al. | 307/132 R |
| 5,272,017 | 12/1993 | Swathirajan et al. | |
| 5,316,871 | 5/1994 | Swathirajan et al. | |
| 5,605,770 | 2/1997 | Andreoli et al. | |
| 5,763,113 | 6/1998 | Meltser et al. | |
| 5,834,924 | * 11/1998 | Konopka et al. | 323/222 |
| 5,861,734 | * 1/1999 | Fasullo et al. | 323/222 |
| 5,883,502 | * 3/1999 | Spitaler | 323/222 |
| 5,929,614 | * 7/1999 | Copple | 323/222 |
| 5,949,229 | * 9/1999 | Choi et al. | 323/320 |
| 5,982,156 | * 11/1999 | Weimer et al. | 323/222 |
| 5,982,157 | * 11/1999 | Wattenhofer et al. | 323/222 |
| 6,005,780 | * 12/1999 | Hua | 363/20 |
| 6,034,513 | * 3/2000 | Farrington et al. | 323/222 |
| 6,043,633 | * 3/2000 | Lev et al. | 323/222 |

OTHER PUBLICATIONS

Natural Gas power Plant System (a descriptive drawing) "No Date".

* cited by examiner

*Primary Examiner*—Adolf Deneke Berhane
(74) *Attorney, Agent, or Firm*—Anthony L. Simon; Karl F. Barr, Jr.; Linda M. Deschere

(57) ABSTRACT

A DC/DC converter for a fuel cell includes an input node for receiving DC supply power from the fuel cell. An output node provides a DC output voltage. An inductor has inductance which varies with respect to inductor current. The inductor includes a first terminal and a second terminal. The first terminal is coupled with the input node for receiving DC supply power from the fuel cell. A switch is coupled between the second terminal of the inductor and ground. A control circuit switches the switch between an open position and a closed position.

13 Claims, 1 Drawing Sheet

DC/DC CONVERTER FOR A FUEL CELL HAVING A NON-LINEAR INDUCTOR

FIELD OF THE INVENTION

The present invention relates to a DC/DC converter and, more particularly, to a DC/DC converter for a fuel cell.

BACKGROUND OF THE INVENTION

Fuel cells have been used as a power source in many applications. Fuel cells have also been proposed for use in electrical vehicular power plants to replace internal combustion engines. Typically, fuel cells are stacked or arranged so as to provide a single supply power. However, most electric-powered vehicles require an operating voltage which is greater than the supply voltage provided by most fuel cell stacks. As a result, a DC/DC boost converter is needed to increase or boost the voltage from the fuel cell stack up to the required operating voltage level.

Known DC/DC converters used in such fuel cell applications typically include an inductor and a switching means. To date, the inductor has been designed such that the inductance remains relatively constant as the current through the inductor varies from a low load to high load condition. This type of inductor is commonly referred to as a linear inductor. FIG. 1 is a graph illustrating a substantially linear rate of inductance versus current for a typical known linear inductor used in DC/DC converters.

The linear inductor includes a first terminal for receiving supply power from the fuel cell stack and a second terminal connected to ground by way of the switching means. The switching means has an open position and a closed position. In the closed position, the switching means creates an electrical path between the second terminal of the inductor and ground. In the open position, the switching means opens the electrical path between the second terminal of the inductor and ground or, in other words, creates an open circuit. The switching means is switched or toggled between the open and closed positions at a switching frequency to alternately produce and collapse a magnetic inductance field about the inductor and charge an output capacitor. In this manner, the converter provides an increased output voltage.

In known DC/DC converters which include a linear inductor, repetitively switching or toggling the switching means between the open and closed positions produces an AC ripple current. Ripple current is an increase in current draw, relative to a nominal current draw, upon the fuel cell stack when the switching means is closed. The linear inductor typically used in DC/DC converters produces a constant AC ripple current during both low and high load conditions. Ripple current detrimentally effects the fuel cell stack by increasing the effective or RMS current drawn from the fuel cell, thereby, increasing ohmic losses in the fuel cell stack and decreasing fuel cell efficiency. Typically, the amount of voltage produced by a fuel cell is used as a measure of the efficiency of that fuel cell.

One way to reduce or limit the effect of ripple current is to increase the switching frequency of the switching means. However, a higher switching frequency results in increased switching losses in the semiconductors (i.e. the transistors and diodes) within the converter. Accordingly, it would be desirable to provide a DC/DC converter which overcomes the shortcomings of the prior art.

SUMMARY OF THE INVENTION

The present invention is a DC/DC converter for a fuel cell. The converter includes an input node for receiving DC supply power from the fuel cell. An output node provides a DC output voltage. An inductor has inductance which varies with respect to inductor current. The inductor includes a first terminal and a second terminal. The first terminal is coupled with the input node for receiving DC supply power from the fuel cell. A switch is coupled between the second terminal of the inductor and ground. A control circuit switches the switch between an open position and a closed position.

The converter can be adapted to (1) minimize ripple current to improve fuel cell efficiency, (2) minimize the switching frequency of the switch to improve converter efficiency, or (3) lower both the ripple current and switching frequency of the converter in comparison to known DC/DC converters.

BRIEF DESCRIPTION OF THE DRAWINGS

The various features, advantages and other uses of the present invention will become more apparent by referring to the following description and drawings in which.

DETAILED DESCRIPTION OF THE PREFERRED EMBODIMENT

Figure 2:
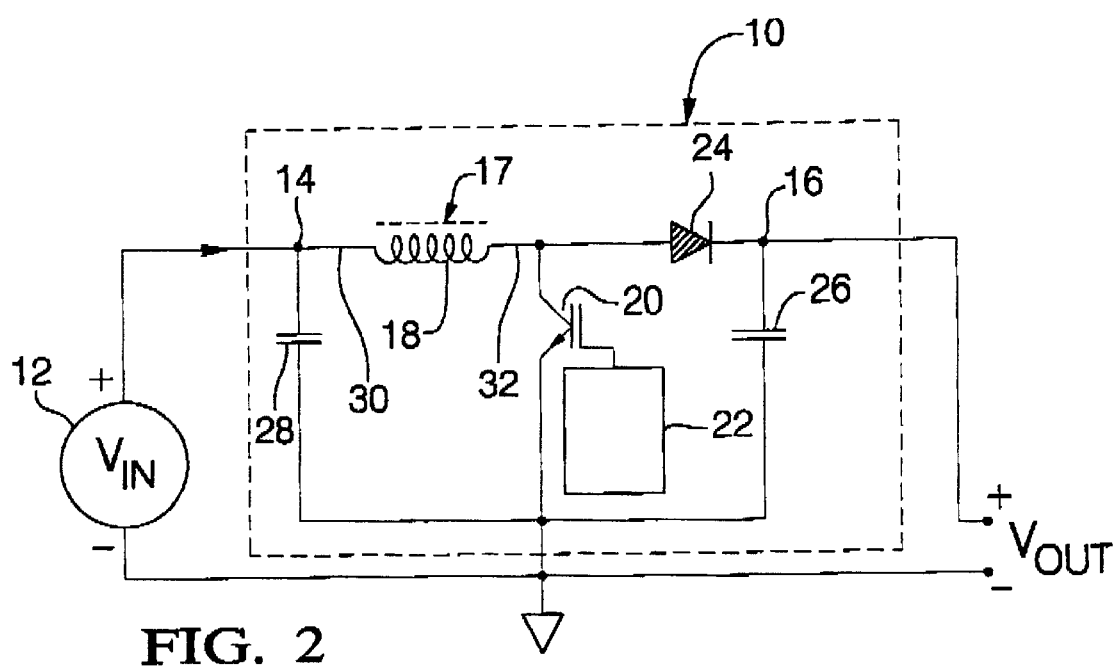
FIG. 2 is an electrical schematic diagram of a DC/DC converter for a fuel cell having a non-linear inductor accordance with the present invention.

FIG. 2 is an electrical schematic diagram of a DC/DC converter 10 for a fuel cell 12 in accordance with the present invention. The term fuel cell is typically used to refer to either a single cell or a plurality of cells (stack), depending on the context. At low or partial load conditions, the present converter 10 minimizes ripple current, minimizes switching frequency, or lowers both ripple current and switching frequency in comparison to known DC/DC converters.

The converter 10 includes an input node 14, an output node 16, an inductor 17, a switch 20, a control circuit 22, a diode 24, and a first capacitor 26. The input node 14 receives DC supply power from the fuel cell 12. The output node 16 provides a DC output power labeled as $V_{OUT}$ in FIG. 2. Preferably, the DC output power is generated to match the required operating voltage for a vehicle.

The inductor 17 includes a winding or coil 18 having first and second terminals or ends 30 and 32, respectively. The first terminal 30 of the winding 18 is coupled with the input node 14 for receiving DC supply power from the fuel cell 12. The switch 20 is coupled between the second terminal 32 of the winding 18 and ground. The control circuit 22 switches the switch 20 between an open position and a closed position.

The first or output capacitor 26 is coupled between the output node 16 and ground. The diode 24 is coupled between the second terminal 32 of the winding 18 and the output node 16 so as to prevent current from flowing from the first capacitor 26 to the second terminal 32 of the winding 18 or the switch 20. Optionally, the converter 10 includes a second or input capacitor 28 coupled between the input node 14 and ground to buffer or smooth the current to the first terminal 30 of the winding 18.

The converter 10 operates in a continuous cycle to provide the desired constant DC output power at the output node 16. The operational cycle of the converter 10 is best described in relation to the position of the switch 20. During a first portion of the operational cycle, the switch 20 is opened by the control circuit 22 and current from the fuel cell 12 flows through the boost inductor 17 and the diode 24 to the output node 16. During this portion of the operational cycle, the output capacitor 26 is charged with voltage and a magnetic inductance field, produced about the winding 18 by the current passing through the inductor 17, decreases or collapses. The collapse of the magnetic inductance field about the winding 18 increases the voltage at the output node 16 up to the desired DC output voltage.

During the second portion of the operational cycle, the switch 22 is closed by control circuit 22 and current from the fuel cell 12 flows through the inductor 17 and the switch 20 to ground. During this time, the magnetic inductance field about the winding 18 strengthens or grows and the voltage stored in the output capacitor 26 is partially discharged. The partial discharge of voltage from the output capacitor 26 buffers or maintains the voltage at the output node 16 to the desired DC output voltage. As a result, the DC output voltage at the output node 16 remains relatively constant throughout the entire operational cycle. When operating, the converter 10 continuously repeats this operational cycle.

When the switch 22 is switched or toggled repetitively between the open and closed positions, an AC ripple current component is imposed upon the DC current supplied by the fuel cell 12. As previously described, the ripple current detrimentally effects the fuel cell 12.

In a preferred embodiment, the switch 20 is a transistor and the control circuit 22 is a micro-controller for switching the transistor on and off to pulse-width modulate (PWM) the DC supply power through the converter 10 to the output node 16. The voltage difference across the converter 10 or, in other words, the voltage difference between the DC supply voltage and the DC output voltage, is a function of the PWM rate or duty cycle. For example, a PWM rate of 50% (i.e. when the transistor on time is equal to the transistor off time) produces a DC output voltage equal to the DC supply voltage multiplied by two. Thus, the DC output voltage can be particularly generated to match most any desired voltage level by altering the PWM rate accordingly. One of ordinary skill in the art will recognize that the PWM rate and values/size of the inductor 17 and the output capacitor 26 are selected to perform the aforementioned functions and achieve the aforementioned results.

Figure 3:
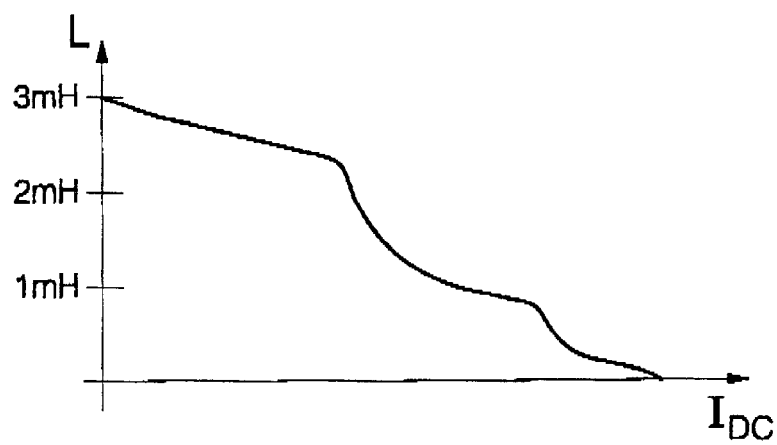
FIG. 3 is a graph illustrating an exemplary non-linear rate of inductance versus current for a non-linear inductor in accordance with the present invention.

Unlike known DC/DC converters used in fuel cell applications, the present converter 10 includes an inductor 17 having an inductance which varies at a non-linear or non-constant rate with respect to current through the inductor 17. As such, the inductor 17 is properly referred to as a non-linear inductor. FIG. 3 is a graph illustrating an exemplary non-linear rate of inductance versus current through a non-linear inductor in accordance with the present invention. Preferably, the inductor 17 has a maximum inductance at a minimum inductor current range and the inductance decreases as the inductor current or, in other words, the current through the inductor 17 increases. In this manner, the inductance value is greatest at low or partial load conditions.

Within DC/DC converters, ripple current is produced when the switching means is switched or toggled repetitively between the open and closed positions. The amount or amplitude of ripple current produced is an inverse function of the switching frequency of the switching means. Thus, decreasing the switching frequency increases the amount of ripple current produced and increasing the switching frequency decreases the amount of ripple current produced. The rate of ripple current production, or in other words the rate at which ripple current is produced, is inversely proportional to the inductance value of the inductor. Thus, the greater the inductance the lower the ripple current production rate and the lower the inductance the greater the ripple current production rate.

Figure 1:
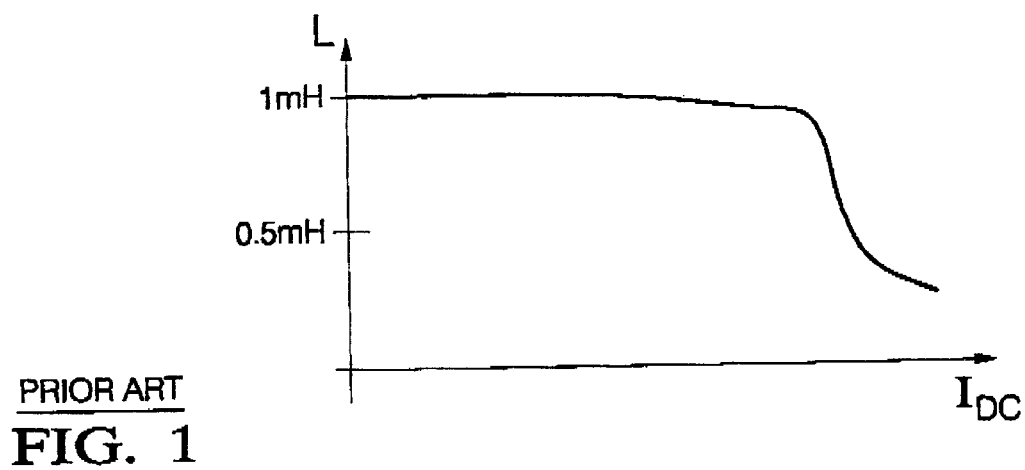
FIG. 1 is a graph illustrating a substantially linear rate of inductance versus current for a typical known linear inductor.

At low or partial load conditions, the inductance value of the non-linear inductor, as shown in FIG. 3, is greater than the inductance value of a known linear inductor, as shown in FIG. 1. Thus, during low or partial load conditions, the amount of ripple current produced by the non-linear inductor 17 of the present converter 10 is less than the amount of ripple current produced by a known linear inductor. In this manner, the present converter 10 minimizes or lowers ripple current to improve fuel cell efficiency.

Alternatively, the present converter 10 can be adapted to allow for a lower switching frequency. However, decreasing the switching frequency increases the amount of the ripple current produced. Capitalizing upon the reduced amount of ripple current produced by the non-linear inductor 17, the switching frequency of the present converter 10 can be reduced in comparison to known converters while the overall amount or effect of ripple current, produced by the present invention and known converters, upon a fuel cell remains the same. In this manner, the present converter 10 allows for a minimal or lower switching frequency to improve converter efficiency.

In summary, the present converter 10 can be adapted to (1) minimize ripple current to improve fuel cell efficiency, (2) minimize the switching frequency of the switch 22 to improve converter efficiency, or (3) lower both the ripple current and switching frequency of the converter 10 in comparison to known DC/DC converters.

While this invention has been described in terms of certain embodiments thereof, it is not intended that it be limited to the above description, but rather only to the extent set forth in the following claims.

The embodiments of the invention in which an exclusive property or privilege is claimed are defined in the following claims:

What is claimed is:

1. A DC/DC converter for a fuel cell, the converter comprising:
   an input node for receiving DC supply power from the fuel cell;
   an output node for providing a DC output voltage;
   an inductor having inductance which varies with respect to inductor current, said inductor including a first terminal and a second terminal, said first terminal coupled with said input node for receiving DC supply power from the fuel cell;
   a switch coupled between said second terminal of said inductor and ground; and
   a control circuit for switching said switch between an open position and a closed position,
   wherein the inductance of said inductor decreases as the inductor current through said inductor increases.

2. The converter of claim 1, wherein the inductance of said inductor varies with respect to the inductor current through said inductor at a non-constant rate.

3. The converter of claim 1, wherein said inductor has a maximum inductance at a minimum inductor current.

4. The converter of claim 3, wherein the maximum inductance produces a minimum amount of ripple current when said switch is disposed in the closed position.

5. The converter of claim 1, including a first capacitor coupled between said output node and ground.

6. The converter of claim 5, including a first diode coupled between said second terminal of said inductor and said output node for preventing current from flowing from said first capacitor to said second terminal of said inductor.

7. The converter of claim 5, including a second capacitor coupled between said input node and ground.

8. The converter of claim 1, wherein said switch is a transistor.

9. The converter of claim 1, wherein said control circuit is a micro-controller.

10. In a DC/DC converter for a fuel cell, the converter having a step-up voltage circuit, the improvement comprising:

an inductor having inductance which varies with respect to inductor current, wherein the inductance of said inductor decreases as the inductor current through said inductor increases.

11. The improvement of claim 10, wherein the inductance of said inductor varies with respect to the inductor current through said inductor at a non-constant rate.

12. The converter of claim 10, wherein said inductor has a maximum inductance at a minimum inductor current.

13. The converter of claim 12, wherein the maximum inductance produces a minimum amount of ripple current when said switch is disposed in the closed position.

* * * * *